United States Patent [19]

Morikawa et al.

[11] Patent Number: 4,558,185

[45] Date of Patent: Dec. 10, 1985

[54] SUBSCRIBER LINE INTERFACE CIRCUIT WITH COMPLEX IMPEDANCE

[75] Inventors: Yuichi Morikawa, Zushi; Kazuo Saito, Yokohama; Eiichi Amada, Kokubunji; Hirotoshi Shirasu, Yokohama, all of Japan

[73] Assignees: Nippon Telegraph & Telephone Public Corp.; Hitachi, Ltd., both of Tokyo, Japan

[21] Appl. No.: 445,976

[22] Filed: Dec. 1, 1982

[30] Foreign Application Priority Data

Dec. 2, 1981 [JP] Japan .................. 56-192952

[51] Int. Cl.[4] .............................. H04B 1/58
[52] U.S. Cl. ..................... 179/170 NC; 179/170 R
[58] Field of Search .......... 179/170 NC, 170.2, 170.6, 179/170.8, 16 F, 170 D, 81 A, 170 R

[56] References Cited

U.S. PATENT DOCUMENTS

| 4,100,515 | 5/1977 | Gupta | 333/80 R |
| 4,174,470 | 11/1979 | Seidel | 179/170 NC |
| 4,284,859 | 8/1981 | Araseki | 179/170 D |
| 4,358,643 | 11/1982 | Levy | 179/170 NC |
| 4,387,273 | 6/1983 | Chea, Jr. | 179/16 F |
| 4,388,500 | 6/1983 | Regan | 179/170 NC |

FOREIGN PATENT DOCUMENTS 0037937  3/1982  Japan ............. 179/170 NC

OTHER PUBLICATIONS

"An Electric Hybrid with Adaptive Balance", B. Dotter et al., International Conf. on Communications, Seattle, Wash., Jun. 1980, pp. 44.5/1–5.

"Hybrid with Automatic Selection of Balance Networks", Alejandro de la Plaza, IEEE Int'l. Symposium on Circuits and Systems, Chicago, Ill., Apr. 1981, pp. 27–29.

"An Electronic Hybrid with Adaptive Balancing for Telephony", D. Messerschmitt, IEEE Transactions on Communications, Aug. 1980, vol. COM 28, No. 8, pp. 1399–1407.

Primary Examiner—Thomas W. Brown
Assistant Examiner—R. Vaas
Attorney, Agent, or Firm—Antonelli, Terry & Wands

[57] ABSTRACT

For the purpose of realizing a line circuit, especially a two-wire four-wire conversion circuit of a telephone exchange in the form of LSI and providing the conversion circuit with an impedance which is suitable to a side tone characteristic of the telephone set, in a line circuit composed of a hybrid circuit wherein the four-wire input line is connected to the two-wire subscriber line via a buffer amplifier and a terminating impedance and in addition the four-wire output line is connected to the output of a subtractor which subtracts an input signal of the four-wire input line passed through a filter circuit from a signal fed from the two-wire subscriber line, the terminating impedance is formed by a resistor component and in addition a feedback circuit having such a transfer characteristic that the impedance of the line circuit seen from the two-wire subscriber line side will become a specified complex impedance is installed between a line which couples the two-wire subscriber line to the subtractor and an input of the buffer amplifier.

8 Claims, 4 Drawing Figures

SUBSCRIBER LINE INTERFACE CIRCUIT WITH COMPLEX IMPEDANCE

The present invention relates to a line circuit, and more particularly relates to a terminating circuit employed in a line circuit of a telephone exchange.

In a time division exchange for the telephone, a voice analog signal from a telephone set is converted into a PCM signal to be exchanged. For the time division exchange, therefore, the so-called four wire exchange must be adopted wherein the transmitting signal is passed through a transmission line which is different from that for the receiving signal. On the other hand, a subscriber line is a two-wire transmission line through which the transmission signal as well as the receiving signal are passed. Therefore, a signal fed from a subscriber line is subjected to two-wire four-wire conversion at a subscriber line circuit which acts as an interface between the subscriber line and the exchange. For a two-wire four-wire conversion circuit (hybrid circuit), especially for a two-wire four-wire conversion circuit including no hybrid transformer on purpose to realize a small-sized circuit composed of a large scale integration circuit (LSI), it is necessary to provide a terminating impedance between the four-wire input line and the two-wire line so that the receiving signal from the four-wire input line may be applied only to the two-wire line and the signal from the two-wire line may be applied only to the four-wire output line. It is conceivable to use a resistor component as this terminating impedance. However, the terminating impedance largely affects the side tone characteristic of the telephone set. The side tone characteristic is represented by a degree to which the transmitting voice signal of a telephone set is reproduced at its own receiver. It is impossible to obtain a sufficiently good side tone characteristic if the terminating impedance is formed only by a resistor component.

If the termination impedance is a complex impedance, a large capacitance is demanded as described later. This brings about extreme disadvantage and difficulty when the line circuit is desired to be realized by using an LSI.

Therefore, an object of the present invention is to realize a line circuit wherein the circuit for providing the terminating impedance is composed of only a resistor component and in addition the equivalent terminating impedance seen from the telephone set side becomes a complex impedance which is suitable to the side tone characteristics of the telephone set.

To achieve the above described object, according to the present invention, in a line circuit of a telephone exchange including a hybrid circuit wherein the four-wire input line is connected to the two-wire subscriber line via a buffer amplifier and a terminating impedance and in addition the four-wire output line is connected to an output of a subtractor which subtracts an input signal of said four-wire input line passed through a filter circuit from a signal fed from said two-wire subscriber line, said terminating impedance is formed by a resistor component (terminating resistor) and in addition a feedback circuit having such a transfer characteristic that the impedance of the exchange side (four-wire side) seen from said two-wire subscriber line side will become a specified complex impedance is installed between a line which couples said two-wire subscriber line to said subtractor and an input of said buffer amplifier.

In accordance with the present invention, it has become possible to obtain optimum side tone characteristics and it is facilitated to produce a hybrid circuit LSI since the terminating impedance is formed by using only a resistor component and the above described feedback circuit can be realized by using only a combination of switched capacitors having small capacitance values and an operational amplifier. In addition, it has been facilitated to realize a line circuit suitable to each of various kinds of telephone sets and subscriber lines by providing a number of switched capacitors in parallel and by changing over the switched capacitors depending upon the particular telephone set and subscriber line.

At first, a terminating impedance for improving the side tone characteristic of a telephone set will be described in order to clarify the present invention.

Figure 1:
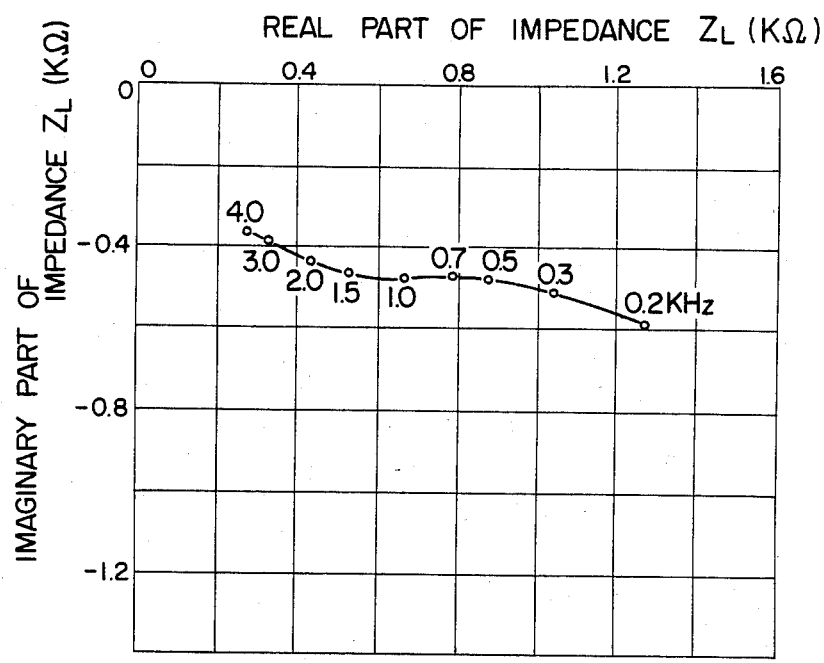
FIG. 1 illustrates an impedance which balances a side tone prevention circuit in a 601-type telephone set at various frequencies.

FIG. 1 shows an impedance ($Z_L$) which is in equilibrium with a balancing circuit in a side tone prevention circuit of a 601 type telephone set when the telephone transmitter ouput level is 0 dB, i.e., 0.775 Volt. The 601 type is a typical telephone set used in Japan. FIG. 1 is cited from the Electrical Communication Laboratory's Technical Journal, vol. 27, No. 6, P. 136.

Figure 2:
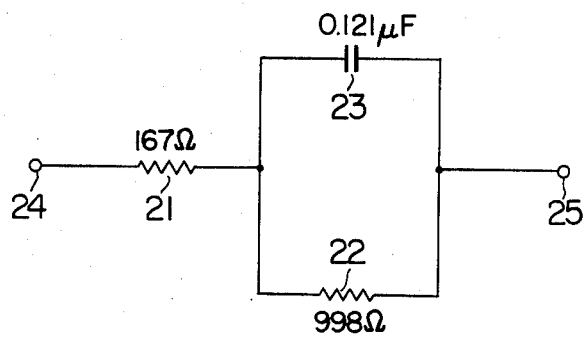
FIG. 2 shows a two-terminal complex impedance circuit using discrete components.

When the above described telephone set is connected to a line circuit in an exchange via a subscriber line (two-wire line), therefore, it is favorable for an impedance of the line circuit seen from the telephone set ($Z_L'$) to be near the above described impedance $Z_L$ in order to obtain a satisfactory side tone characteristic. The impedance $Z_L'$ is determined by a terminating impedance $Z_B$ of the line circuit and a characteristic impedance $Z_O$ of the subscriber line. For instance, in case that the subscriber line is 0.5 mm in diameter and 1 dB/km in line loss, the terminating impedance $Z_B$ is represented as $$Z_B = Z_O \frac{Z_L - Z_O \tanh rl}{Z_O - Z_L \tanh rl}$$

where $Z_O$ denotes the characteristic impedance of the subscriber line, r denotes the propagation constant of the subscriber line, and l denotes the length of the subscriber line. It is conceivable to use a two-terminal network as shown in FIG. 2 in order to approximately realize the impedance $Z_B$. Since a capacitor of approximately 0.1 F is required, however, it is difficult to realize the circuit shown in FIG. 2 in the form of an LSI.

Figure 3:
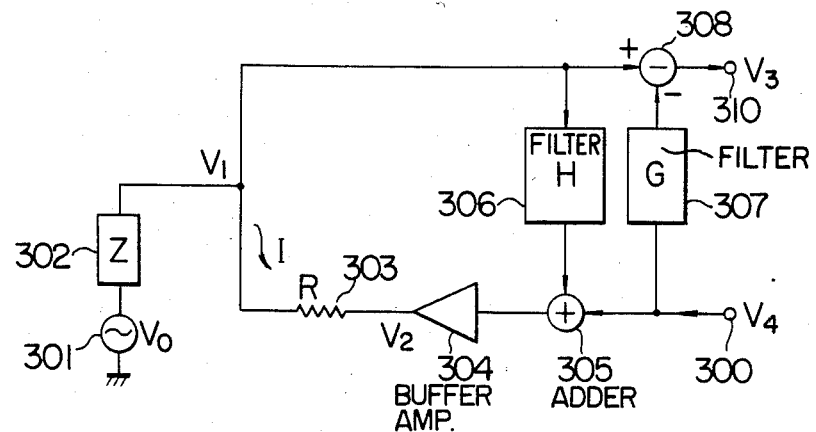
FIG. 3 shows the configuration of a line circuit which is an embodiment of the present invention.

FIG. 3 shows the configuration of a line circuit which is an embodiment of the present invention. Although the line circuit has a DC supply function, the AC impedance of the DC supply circuit is high so that it can be disregarded. Only the circuit concerning the AC impedance will be described hereafter. In FIG. 3, numeral 301 denotes a voltage source caused by a transmitter within a telephone set. Numeral 302 denotes an impedance z of the subscriber side when it is seen from the exchange. Numeral 303 denotes a terminating resistor.

Numeral 304 denotes a buffer amplifier. Numeral 305 denotes an adder. Numeral 306 denotes a feedback circuit (filter) having a transfer function H. Numeral 307 denotes a filter having a transfer function G. And numeral 308 denotes a subtractor.

A signal received at an input terminal 300 of a four-wire input line is applied to a receiver within the telephone set via the adder 305, the buffer amplifier 304, the terminating resistor 303 and the two-wire subscriber line. The signal 301 produced by the transmitter within the telephone set is fed to an output terminal 310 of a four-wire output line via the two-wire subscriber line and the subtractor 308 for the two-wire subscriber line. The subtractor 308 and the filter 307 jointly function to compensate the leakage of the signal received at the four-wire input line into the four-wire output line so that the output terminal 310 may send out signals supplied only from the telephone transmitter excluding the above described leakage.

In FIG. 3, according to the present invention, the filter 306 is provided as a feedback circuit from the input line of the subtractor 308 to the four-wire input line, i.e., the input line of the buffer amplifier 304. Unless this feedback circuit is provided, the terminating resistor 303 must be replaced by the two-terminal network as shown in FIG. 2 in order to obtain the satisfactory side tone characteristic of the telephone set. In this embodiment, owing to the above described feedback circuit, it has become possible to realize a complex terminating impedance which is equivalent to a terminating impedance obtained when the above described two-terminal impedance as shown in FIG. 2 is connected in place of the resistor 303. The detailed configuration of the filter circuit 306 will be hereafter described.

Since the filter 306 and the subtractor 308 have extremely high input impedance, the current flowing into the four-wire output line side is negligible. Therefore, the impedance of the four-wire line side (exchange side) seen from the subscriber line side, i.e., the terminating impedance $Z_B$ can be determined by dividing the voltage $V_1$ at a point connecting the two-wire line to the four-wire lines by the current I flowing from the above described connecting point into the four-wire input line side. Denoting the output voltage of the buffer amplifier 304 and the resistance value of the terminating resistor 303 respectively as $V_2$ and R, the terminating impedance is represented as $$Z_B = \frac{V_1}{I} = \frac{V_1}{\frac{V_1 - V_2}{R}} = \frac{V_1}{V_1 - V_2} R. \quad (1)$$

Since the signal now in concern is that sent from the telephone set to the exchange, it is permissible to think that the received signal on the four-wire input line, the voltage of which is represented by $V_4$, is absent. Accordingly, $V_2 = HV_1$. Thus, equation (1) can be rewritten as $$Z_B = \frac{V_1 R}{V_1(1 - H)} = \frac{R}{1 - H}. \quad (2)$$

From the equation (2), the transfer function H of the filter 306 becomes $$H = 1 - \frac{R}{Z_B}. \quad (3)$$

The complex terminating impedance $Z_B$ which is favorable in view of the side tone characteristic of the telephone set is already known as described referring to FIG. 1. Accordingly, the transfer function of the filter 306 can be determined according to the equation (3).

When the filter 306 is provided, the output voltage $V_3$ at the output terminal 310 of the four-wire output line is represented as $$V_3 = \left( \frac{1}{1 - H + \frac{R}{Z}} - G \right) V_4 + \frac{R}{R + Z - ZH} V_0. \quad (4)$$

Therefore, if the equation $$G = \frac{1}{1 - H + \frac{R}{Z}} \quad (5)$$

is satisfied, the leakage of the voltage $V_4$ into $V_3$, i.e., the leakage from the four-wire input line side into the four-wire output line can be suppressed, the hybrid function being achieved.

Figure 4:
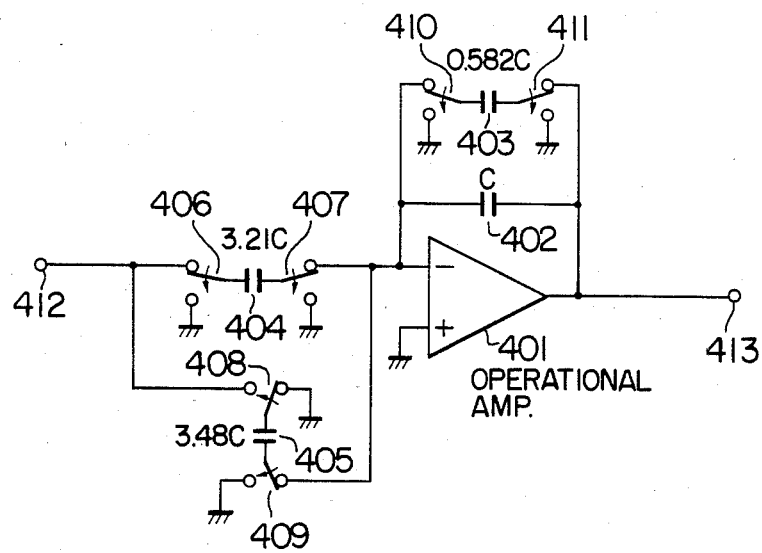
FIG. 4 shows the circuit diagram of a feedback circuit which is used in the embodiment shown in FIG. 3.

Subsequently, the concrete circuit of the above described filter 306 will be described hereafter. FIG. 4 shows the schematic circuit of the filter 306 when it is realized in the form of so-called switched capacitor filter which comprises switched capacitors and an operational amplifier. Since the constitution technique for the switched capacitor filter itself is already well known, here the design technique for determining the component values in the circuit of FIG. 4 will be described. The complex impedance in the embodiment of FIG. 3 must be equal to the specified value as shown in FIG. 2.

Denoting the component values of the resistors 21 and 22 and the capacitor 23 respectively as $R_1$, $R_2$ and C, the impedance of the circuit illustrated in FIG. 2 is represented as $$Z_B = R_1 + \frac{1}{\frac{1}{R_2} + sC} = \frac{(R_1 + R_2) + sCR_1R_2}{1 + sCR_2},$$

where $s = j\omega$. Hence, from equation (3), the transfer function H(s) of the filter 306 can be written as $$H(s) = 1 - \frac{R}{Z_B} = \frac{(R_1 + R_2 - R) + sCR_2(R_1 - R)}{R_1 + R_2 + sCR_1R_2}.$$

Assuming that R=600, $R_1$=167, $R_2$=998 and C=0.121 F, the transfer function H(s) can be reduced to $$H(s) = \frac{0.485 - 4.49 \times 10^{-5}s}{1 + 1.73 \times 10^{-5}s}. \quad (7)$$

In order to realize this transfer function H(s) by using a switched capacitor filter as shown in FIG. 4, the bilinear z-transform $$s = \frac{2}{T} \cdot \frac{z-1}{z+1}$$

is applied to the transfer function, where $T = 1/f_s$ denoting $f_s$ as the sampling frequency. By selecting the sampling frequency of 128 kHz, the bilinear z-transform causes little change upon the frequency response over the voice band (0.3 to 3.4 kHz). The resultant z-form transfer function becomes $$H(z) = \frac{2.03 - 2.20 z^{-1}}{1 - 0.632 z^{-1}}. \tag{8}$$

The z-form transfer function has been derived from the component values in the network shown in FIG. 2. It can also be directly determined by using the equation (3).

The transfer function of equation (8) can be realized by using the switched capacitor filter as illustrated in FIG. 4. The input terminal 412 shown in FIG. 4 is connected to the point where the two-wire subscriber line is coupled to the four-wire output line. The output terminal 413 is connected to the adder 305 which is coupled to the four-wire input line as shown in FIG. 3. In the filter, the negative input terminal of an operational amplifier 401 is connected to its output terminal via a feedback capacitor 402 and the positive input terminal of the operational amplifier 401 is connected to the ground. Between the input terminal 412 of the filter and the negative input terminal of the operational amplifier 401, a first switched capacitor 404 and a second switched capacitor 405 are connected in parallel respectively via switches 406 and 407 and switches 408 and 409. Across the above described feedback capacitor 402, a third switched capacitor 403 is connected via switches 410 and 411. All of the above described switches, capacitors and an operational amplifier can be realized by using MOS LSI. Each switch is driven by a pulse signal having a repetition period of T which belongs to one of two kinds of periodic pulse signals. These two pulses do not stay in ON states concurrently. The contact of each switch periodically transfers between the illustrated state and the state indicated by the arrow. Thus, each switched capacitor is periodically charged and discharged. As a result, the transfer function expressed in the equation (8) is realized. Assuming that the feedback capacitor 402 has the capacitance value C, other switched capacitors respectively must have capacitance values as illustrated in FIG. 4.

FIG. 4 shows a particular type of switched capacitor filter as an embodiment of the present invention. However, the present invention is not restricted to the particular type but can be also applied to other switched capacitor filters or digital filters. (When digital filters are used, A/D, D/A converters are required.)

FIG. 4 shows an embodiment for case where the complex terminating impedance of the line circuit is represented by the network as shown in FIG. 2. However, by providing the above described switched capacitor circuit with changeover circuits so as to cope with different types of telephone sets and different transmission lines, it becomes possible to realize a widely applicable filter.

As heretofore described referring to embodiments, the present invention facilitates realization of an integrated terminating circuit and further facilitates a variable impedance which can be altered depending upon the wire diameter and line length of a subscriber line. As a result, a small-sized, high performance, low-priced terminating circuit can be realized.

What is claimed is:

1. A subscriber line interface circuit comprising:
   a buffer amplifier for transmitting a signal fed from a four-wire input line to a two-wire subscriber line;
   a terminating impedance including a resistor inserted between said buffer amplifier and said two-wire subscriber line;
   a filter circuit having an input connected to said four-wire input line;
   a subtractor for subtracting the output signal of said filter circuit from a signal on said two-wire subscriber line to feed the resultant difference signal to a four-wire output line; and
   a feedback circuit having an input connected to said two-wire subscriber line and said subtractor, an output connected to the input of said buffer amplifier, and having such transfer characteristics that the impedance of the four-wire input line seen from said two-wire subscriber line is a complex impedance, wherein the transfer function H of said feedback circuit is $$H = 1 - \frac{R}{Z_B}$$

where r is the value of said terminating resistor and $Z_B$ is a desired terminating impedance for providing a telephone set connected to said subscriber line with a satisfactory side tone characteristic.

2. A subscriber line interface circuit according to claim 1, wherein the transfer function G of said filter circuit is $$G = \frac{1}{1 - H + \frac{R}{Z}},$$

where Z is the impedance of the two-wire subscriber line seen from the four-wire input and output lines.

3. A subscriber line interface circuit according to claim 2, wherein said feedback circuit and said filter circuit comprise switched capacitors and operational amplifiers.

4. A subscriber line interface circuit according to claim 6, further comprising changeover circuits added to said switched capacitors for varying the transfer characteristic of said feedback circuit.

5. A subscriber line interface circuit according to claim 1, wherein said feedback circuit and said filter circuit comprise switched capacitors and operational amplifiers.

6. A subscriber line interface circuit according to claim 5, further comprising changeover circuits added to said switched capacitors for varying the transfer characteristic of said feedback circuit.

7. A subscriber line interface circuit comprising:
   a buffer amplifier for transmitting a signal fed from a four-wire input line to a two-wire subscriber line;
   a terminating impedance including a resistor inserted between said buffer amplifier and said two-wire subscriber line;
   a filter circuit having an input connected to said four-wire input line;

a subtractor for subtracting the output signal of said filter circuit from a signal on said two-wire subscriber line to feed the resultant difference signal to a four-wire output line; and a feedback circuit having an input connected to said two-wire subscriber line and said subtractor, an output connected to the input of said buffer amplifier, and having such transfer characteristics that the impedance of the four-wire input line seen from said two-wire subscriber line is a complex impedance, wherein said feedback circuit and said filter circuit comprise switched capacitors and operational amplifiers.

8. A subscriber line interface circuit according to claim 7, further comprising changeover circuits added to said switched capacitors for varying the transfer characteristic of said feedback circuit.

* * * * *